Patented Feb. 16, 1954

2,669,551

UNITED STATES PATENT OFFICE 2,669,551

UREA-FORMALDEHYDE RESIN AND METHOD OF MAKING SAME

Thomas H. Vaughan, Hampton, S. C., assignor to Westinghouse Electric Corporation, East Pittsburgh, Pa., a corporation of Pennsylvania No Drawing. Application January 9, 1953, Serial No. 330,578

4 Claims. (Cl. 260—29.4)

This invention relates to a novel process of preparing an improved urea-formaldehyde resin.

The object of this invention is to provide a novel process for preparing an improved urea-formaldehyde resin by controlling the conditions and times of reaction and the degree of catalysis throughout the reaction by maintaining the pH within critical limits during all stages of the process.

A further object of the invention is to provide novel urea-formaldehyde resinous reaction products.

Other objects of the invention will, in part, be obvious and will, in part, appear hereinafter.

I have discovered that by controlling within critical limits, the amount of urea and formaldehyde reacted, the times of reaction, the temperatures at which the reaction takes place, the times at which the ingredients are admixed, and the degree of catalysis of the reaction by maintaining the pH at predetermined values, an improved urea-formaldehyde resin is produced.

In preparing the resins of my invention, from 1.2 to 2.5 moles of formaldehyde are reacted with 1 mole of urea. In carrying out the reaction, the following procedure is carried out. With the desired amount of aqueous formaldehyde there is admixed an amount of aqueous caustic soda solution sufficient to adjust the pH of the formaldehyde solution within a range of from 9.20 to 9.50. After the pH of the formaldehyde solution has been so adjusted, it is heated to quickly raise its temperature to substantially 150° F. Upon reaching this temperature, while the formaldehyde solution is being rapidly agitated, from 75% to 85% by weight of the total amount of urea that is to be reacted with the formaldehyde, is added to the solution. As soon as this amount of urea is in solution, the pH is checked and, if necessary, adjusted to be between 9.20 and 9.50. The solution is then brought to a boil at atmospheric pressure and held at boiling temperature for from 15 to 60 minutes.

At the end of this boiling period, there is rapidly added sufficient aqueous phosphoric acid to adjust the pH to from 4.55 to 4.75. Heating of the reaction product is continued during the addition of the acid. Good agitation is maintained during these steps.

At the end of twelve minutes, plus or minus a minute, from the time the phosphoric acid is first introduced into the reaction product, caustic soda is quickly added to bring the pH to a value of from 7.2 to 7.8. The alkaline product is then cooled rapidly to a temperature of from 180° F. to 200° F. Then the remainder of the urea is added while rapidly stirring. The reaction product is permitted to stand for an hour or more and then cooled to room temperature.

It is critical that the reaction product be heated for not more than a minute beyond the twelve minute period while at a pH of 4.55 to 4.75, otherwise it will become insoluble in water. The second addition of urea is necessary to control the free formaldehyde and odor, as well as the type of resin produced. As soon as the resin solution cools to room temperature, it is pumped into storage tanks to await use.

By having an excess molar ratio of formaldehyde to urea and then reducing that ratio by a second addition of urea, while maintaining the pH within critical limits at all times, a proper balance is produced in the resulting resin product between monomethylol-urea and dimethylol-urea to give the desired properties.

The aqueous resin varnish produced by the above process has a normal shelf-life at room temperature of around six months. It comprises from 50% to 53% resin solids, has a viscosity of from 25 to 50 cps., a pH of around 7.5 and has from 1% to 3% free formaldehyde. The resin is extendable with water.

The low amount of free formaldehyde in the resin of this invention is of particular importance as the vapors of free formaldehyde, common to this type of resin, are a source of dermatitis to many people. An analysis of the air around an area where this resin was being used extensively contained less formaldehyde than required in established health standards.

The following is an example of the preparation of a urea formaldehyde resin in accordance with my invention:

Example

In a 500 gallon capacity open kettle there was poured 2090 lbs. of aqueous formaldehyde. To this aqueous formaldehyde solution there was added 8 normal aqueous caustic soda solution in an amount sufficient to provide a pH of 9.35. Sufficient heat was then applied to the kettle to quickly bring the temperature of the solution up to 150° F. With the solution being rapidly agitated, there was admixed therewith 788 lbs. of crystalline urea. With this addition, there was a slight drop in temperature of the solution accompanied also with a slight drop in pH. As soon as all of the urea was in solution its pH was checked and adjusted to a pH of between 9.30 and 9.40. The solution was then brought to a boil at atmospheric pressure and held at boiling temperature for 40 minutes. At the end of this boiling period, a sufficient amount of 85% phosphoric acid diluted 1 to 4 with water (approximately 17% $H_3PO_4$) was added to bring the pH of the urea-formaldehyde solution to 4.65. The cooking was continuous with the addition of the acid and was continued for 12 minutes from the time of its addition. At the end of the 12 minute cooking period, 8 normal aqueous caustic soda was added to bring the pH of the urea-formaldehyde solution to 7.5. Rapid agitation was maintained at all times. After the final addition of caustic soda, the resin was cooled quickly to 190° F., and 178 lbs. of crystal urea was admixed therewith, with continued agitation until all of the urea was in solution. The resin was then allowed to cool to room temperature. The above example produced a yield of 2856 lbs. of resin.

My improved urea-formaldehyde resin has been used as binders and adhesives in the manufacture of plywood, flush doors, decorative laminates, and wood waste board or composition lumber. A coating of the aqueous resin solution is applied to the material, and two or more pieces superimposed and cured, under heat and pressure to produce a laminate. It has also been used as an extender for melamine resins in this same type of manufacture.

The resin has been spray dried to produce a resin powder which, when the dry resin is subsequently mixed with extenders, catalysts, and water, it is useful as an adhesive, and with the addition of suitable fillers, dyes, etc., is usable as a molding powder.

The partially reacted resin, while in liquid form, can be added to the feed boxes of paper machines to provide paper with improved wet strength properties. The resin has sufficient polarity so that it will attach itself to the fibers in dilute varnishes. The customary sizing agents used in paper making do not interfere with such use of the resin. In like manner, the resin can be used with textiles to add crease proofing properties thereto.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. In the process of preparing a urea-formaldehyde resin in which there is reacted a ratio of 1 mole of urea, to 1.2 to 2.5 moles of formaldehyde, the steps comprising admixing with the formaldehyde an amount of caustic soda solution sufficient to adjust the pH of the formaldehyde to be within a range of from 9.20 to 9.50; heating the formaldehyde to quickly raise its temperature to substantially 150° F.; admixing at a rapid rate accompanied with rapid agitation, from 75% to 85% by weight of the total amount of urea that is to be reacted with the formaldehyde; adjusting the pH of the mixture of urea and formaldehyde, as soon as all the added urea is in solution, to be within a range of 9.2 to 9.5; boiling the mixture of urea and formaldehyde at atmospheric pressure for a period of time of from 15 to 60 minutes; quickly admixing with the boiling mixture of urea and formaldehyde at the end of the boiling period an amount of phosphoric acid sufficient to adjust the pH of the mixture to be within a range of from 4.55 to 4.75; continuing the boiling with continuing agitation for a period of substantially 12 minutes; quickly admixing at the end of the 12 minute period, with continuing agitation, caustic soda in an amount sufficient to adjust the pH of the mixture of urea and formaldehyde to from 7.2 to 7.8; quickly cooling the mixture of urea and formaldehyde, with continuing agitation, to a temperature of substantially 190° F. and thereafter admixing the remainder of the urea with the mixture of urea and formaldehyde, whereby a relatively stable aqueous resin solution is produced.

2. The urea-formaldehyde resin solution derived in accordance with the process of claim 1.

3. The process of claim 1 wherein the resulting solution of urea-formaldehyde is dehydrated to provide a dry resin solid.

4. The dried resin derived by the process of claim 3.

THOMAS H. VAUGHAN.

No references cited.